United States Patent [19]
Harigaya et al.

[11] Patent Number: 5,787,227
[45] Date of Patent: Jul. 28, 1998

[54] IMAGE RECORDING APPARATUS

[75] Inventors: Isao Harigaya; Yoshihiro Nakatani; Koji Takahashi, all of Kanagawa-ken, Japan

[73] Assignee: Canon Kabushiki Kaisha, Tokyo, Japan

[21] Appl. No.: 324,151

[22] Filed: Oct. 13, 1994

Related U.S. Application Data

[63] Continuation of Ser. No. 88,908, Jul. 8, 1993, abandoned, which is a continuation of Ser. No. 473,924, Feb. 1, 1990, abandoned.

[51] Int. Cl.$^6$ .................................................. H04N 5/91
[52] U.S. Cl. ...................... 386/95; 386/117; 358/906; 358/909.1; 348/232; 348/239
[58] Field of Search .................... 360/14.1, 14.3, 360/24; 358/311, 906, 909.1; 348/213, 239, 232, 233, 372; 386/95, 117

[56] References Cited

U.S. PATENT DOCUMENTS

| | | | |
|---|---|---|---|
| 4,899,229 | 2/1990 | Hashimoto | 360/14.1 |
| 4,956,651 | 9/1990 | Emori | 346/108 |
| 5,003,404 | 3/1991 | Yoshimura et al. | 358/182 |
| 5,060,087 | 10/1991 | Nishijima et al. | 360/14.1 |

Primary Examiner—Andrew L. Sniezek
Attorney, Agent, or Firm—Robin, Blecker & Daley

[57] ABSTRACT

An image recording apparatus comprises a recording medium; reproducing device for reproducing an image signal recorded on the recording medium; and image processing device for processing an image signal by using an image memory. In performing a specific action, the apparatus stores in the image memory a reproduced image signal obtained from a recording pause part of the recording medium; and records the reproduced signal again on the recording medium together with a given image signal in a composite state.

13 Claims, 6 Drawing Sheets

IMAGE RECORDING APPARATUS

This is a continuation application under 37 CFR 1.62 of prior application Ser. No. 08/088,908, filed Jul. 8, 1993, abandoned which is a continuation of Ser. No. 07/473,924, filed Jan. 1, 1990, abandoned.

BACKGROUND OF THE INVENTION

1. Field of the Invention

This invention relates to an image recording apparatus and more particularly to an image recording apparatus equipped with a special effect circuit.

2. Description of the Related Art

Generally, the image recording apparatus such as a VTR uses an image memory for an improved S/N ratio of normal reproduction, removal of noise bars in the case of special reproduction, etc.. The camera-integrated type VTR also uses an image memory for a special effect shooting such as a wipe or cross-fade effect. In attaining the wipe effect, for example, the last scene of shooting is taken in the image memory. After that, in the head (or introducing) part of an ensuing moving image, a ratio between the image plane occupying rate of a still image stored in the image memory and that of the moving image is gradually changed in a picture splitting manner. An example of the art of attaining this effect is disclosed in U.S. patent application Ser. No. 328,872, filed on Mar. 27, 1989, now U.S. Pat. Ser. No. 5,003,404.

In a practical method for the special effect shooting, for example, recording is put to a pause at the end of shooting one scene. The last picture of the scene is stored in a field memory to be retained there with the power supply kept on. After that, in shooting another scene, the pause is canceled by turning a trigger switch on to resume recording. With recording resumed, the special effect shooting is carried out to attain the above-stated wipe effect or the like.

In accordance with the above-stated example of the prior art, the power supply must be continuously effected in performing the special effect shooting. However, the camera-integrated type VTR is arranged to be driven by means of a battery in general. Electric energy consumption, therefore, must be minimized. The longer the pause of recording is, the greater will be the waste of the limited electric energy.

Another disadvantage of the above-stated example of the prior art lies in that the image usable for the special effect is limited to an image immediately preceding the current shooting image and thus cannot be selected from among a wide range of images as desired.

SUMMARY OF THE INVENTION

It is therefore an object of this invention to provide an image recording apparatus which is arranged to permit reduction in the electric energy consumption.

It is another object of this invention to provide an image recording apparatus which is arranged to permit recording images to be edited and processed as desired.

Under this object, an apparatus which is a preferred embodiment of this invention comprises means for recording and reproducing images on and from a recording medium; and image processing means which processes images by using an image memory. The apparatus is arranged to store in the image memory an image obtained when recording is put to a pause during the process of a specific action and to be capable of causing an image which is recorded on a recording medium and reproduced therefrom to be stored and used as an original image in attaining a special shooting effect. Therefore, electric energy is supplied to the image memory and the image processing means to retain the original image at the image memory when recording is again put to a pause for a special shooting effect attaining process.

It is a further object of the invention to provide an image recording apparatus which has a novel image sensing function.

It is a further object of the invention to provide a novel image recording apparatus which has a good operability.

It is a still further object of the invention to provide a processing device which is advantageous particularly for an image recording apparatus of the kind using a tape-shaped recording medium.

These and other objects and features of this invention will become apparent from the following detailed description of embodiment thereof taken in connection with the accompany drawings.

DETAILED DESCRIPTION OF THE PREFERRED EMBODIMENTS

An embodiment of this invention is described below with reference to the accompanying drawings.

Figure 1:
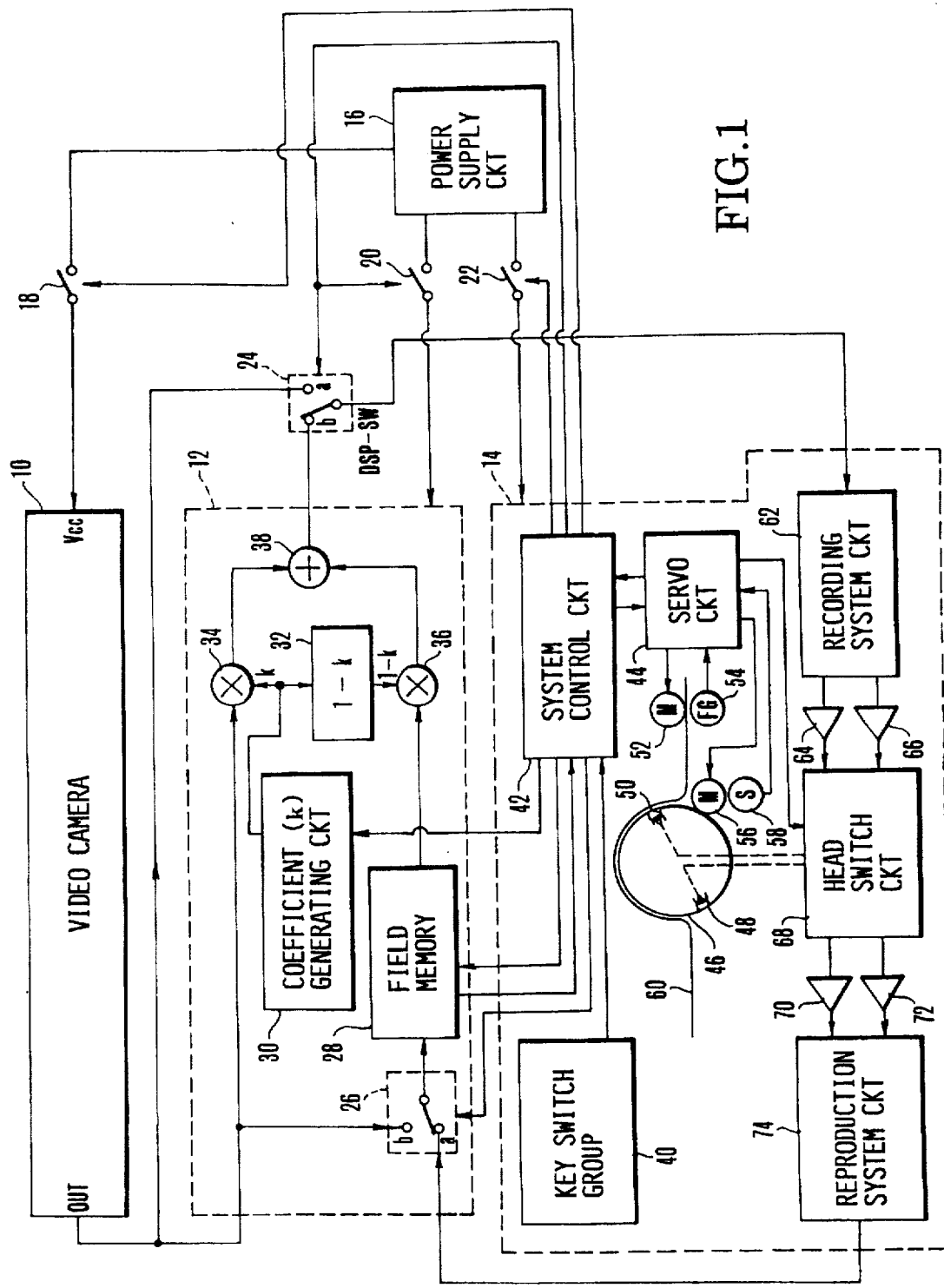
FIG. 1 is a block diagram showing the arrangement of an apparatus arranged as a first embodiment of this invention.

FIG. 1 is a block diagram showing the arrangement of a first embodiment of this invention. The illustration includes a video camera 10 which is provided with an output terminal OUT and a power supply terminal VCC; a special effect shooting circuit 12; a recording and reproduction circuit 14; a power supply circuit 16; and switches 18, 20 and 22 which are arranged to supply the electric energy of the power supply circuit 16 to the video camera 10, the special effect shooting circuit 12 and the recording and reproduction circuit 14 respectively. A DSP switch 24 is arranged to have its connection position on one side "a" thereof in a normal recording mode and on the other side "bag" in a special effect shooting mode. In other words, the recording and reproduction circuit 14 receives either a sensed image signal from the video camera 10 or an image signal from the special effect shooting circuit 12 according to the position of the switch 24.

In the special effect shooting circuit 12a switch 26 is arranged to selectively supply to a field memory 28 either the output of the video camera 10 or a reproduced signal output from the recording and reproduction circuit 14. A coefficient generating circuit 30 is arranged to generate a coefficient k. Another coefficient generating circuit 32 is arranged to generate a coefficient (1-k) in accordance with the coefficient k generated by the coefficient generating circuit 30. Reference numerals 34 and 36 denote multipliers.

A numeral 38 denotes an adder. In the case of a fade effect mode, the connecting position of the switch 26 is shifted to the side "b".

In the recording and reproduction circuit 14 a switch group 40 is arranged to designate an operation mode of the apparatus and consists of a recording switch, a reproduction switch, a recording pause switch, etc.. A system control circuit 42 is arranged to control the operation of switches 18, 20, 22, 24 and 26 as well as to perform control over the whole apparatus. A servo circuit 44 is arranged to control the rotation phases of magnetic heads 48 and 50 disposed on a rotary drum 46 and also to control the rotation speed of a capstan motor 52. A frequency generator (hereinafter referred to as FG) 54 is arranged to detect the rotation frequency of the capstan motor 52. A motor 56 is arranged to drive the rotary drum 46. A sensor 58 is arranged to detect the phase and the rotation frequency of the rotary drum 46. A reference numeral 60 denotes a video tape. A numeral 62 denotes a recording system circuit which is arranged to record on the tape 60 an image signal which is selected by the switch 24. Numerals 64 and 66 denote recording amplifiers. A numeral 68 denotes a head switch which is arranged to switch from one over to the other the two heads 48 and 50 disposed with 180 degree spacing on the rotary drum 46. Numerals 70 and 72 denote reproduction amplifiers. A numeral 74 denotes a reproduction system circuit which is arranged to reproduce a recorded signal from the tape 60.

The embodiment operates as described below with reference to FIG. 2 which is a flow chart.

The embodiment has first and second operation modes. In the first mode, when the DSP switch 24 is turned on while the power supply is in an on-state, an image signal is reproduced from the tape 60 and is written into the field memory 28. In the second mode, when the power supply turns on from an off-state, an image signal is reproduced from the tape 60 irrespectively of the position of the DSP switch 24. The operation in the first mode is first described as follows. In this case, before coming to the operation shown in the flow chart of FIG. 2, an existing record of the tape 60 is reproduced to find out an image which is desired to be subjected to either a cross-fade or wipe effect process. After that, the operation of the embodiment comes to a step S1 of FIG. 2. At the step S1: When the desired reproduced image is found, a recording pause button which is included in the switch group 40 and is interlocked with the recording pause switch is operated. Step S2: A DSP button which, among the switch group 40, is interlocked with the DSP switch 24 and is provided for giving an instruction to bring the apparatus into a special shooting effect mode is operated at a point of time when the running of the tape 60 stops. In response to this instruction, the system control circuit 42 shifts the connecting position of the switch 24 to one side "b". At the same time, the circuit 42 closes the switch 20 to effect a power supply to the special effect shooting circuit 12. Step S3: The system control circuit 42 reads the current tape position from a tape counter which is not shown but is disposed within the system control circuit 42. Step S4: The tape 60 is rewound a little in a short rewinding mode. Step S5: The apparatus takes a reproducing mode. Steps S5, S6 and S7: While counting the output of the FG 54, the tape 60 is brought back to the recording pause position, i.e., the current tape position read out at the step S3.

Step S8: Upon return to the current tape position, the reproduction output of the reproduction system circuit 74 is written into the field memory 28 via the switch 26. Under this condition, the tape 60 is kept in pause as the recording has been put to the pause. Step S9: A shooting scene is decided. A trigger switch is turned on to begin shooting. Step 10: The flow of operation comes to a step S11 in the case of cross-fade shooting. At the step S11, a cross-fade shooting process is performed in the following manner: Under the control of the system control circuit 42, the coefficient generating circuit 30 generates a coefficient k which gradually increases from "0" to "1". The multiplier 34 multiplies the output of the video camera 10 by the value k. The other multiplier 36 multiplies the output of the field memory 28 by a value (1-k). The outputs of these multipliers 34 and 36 are added together by the adder 38. The output of the adder 38 is supplied via the switch 24 to the recording system circuit 62 to be magnetically recorded on the tape 60 through the amplifiers 64 and 66. With the value k gradually varying from "0" to "1", the image recorded when recording is put to pause is gradually replaced with the image obtained by the camera 10.

Step S14: When value of the coefficient k reaches "1", the system control circuit 42 shifts the position of the switch 24 to the other side "a" thereof. The switch 20 is turned off to cut off the power supply to the special effect shooting circuit 12. This brings the cross-fade process to an end. After that, there obtains the normal mode of recording a camera signal.

In the event of wipe effect shooting, the flow comes from the step S10 to a step S12. Step S12: The value of coefficient k is alternately changed between "0" and "1" in such a way as to gradually change the ratio of the picture-occupying rate of the image output from the memory 28 to that of the image output from the video camera 10. When the picture comes to be occupied entirely by the image output from the camera 10, the flow comes to the step S14 to bring the apparatus into the normal recording mode by turning the switch 20 off.

After the pause of recording, if the DSP button is not turned on (at the steps S1 and S2), the flow comes to the step S14 to have the normal recording mode. The timing of the above-stated flow of operation is represented by a period I shown in FIG. 3 which is a timing chart.

Figure 2:
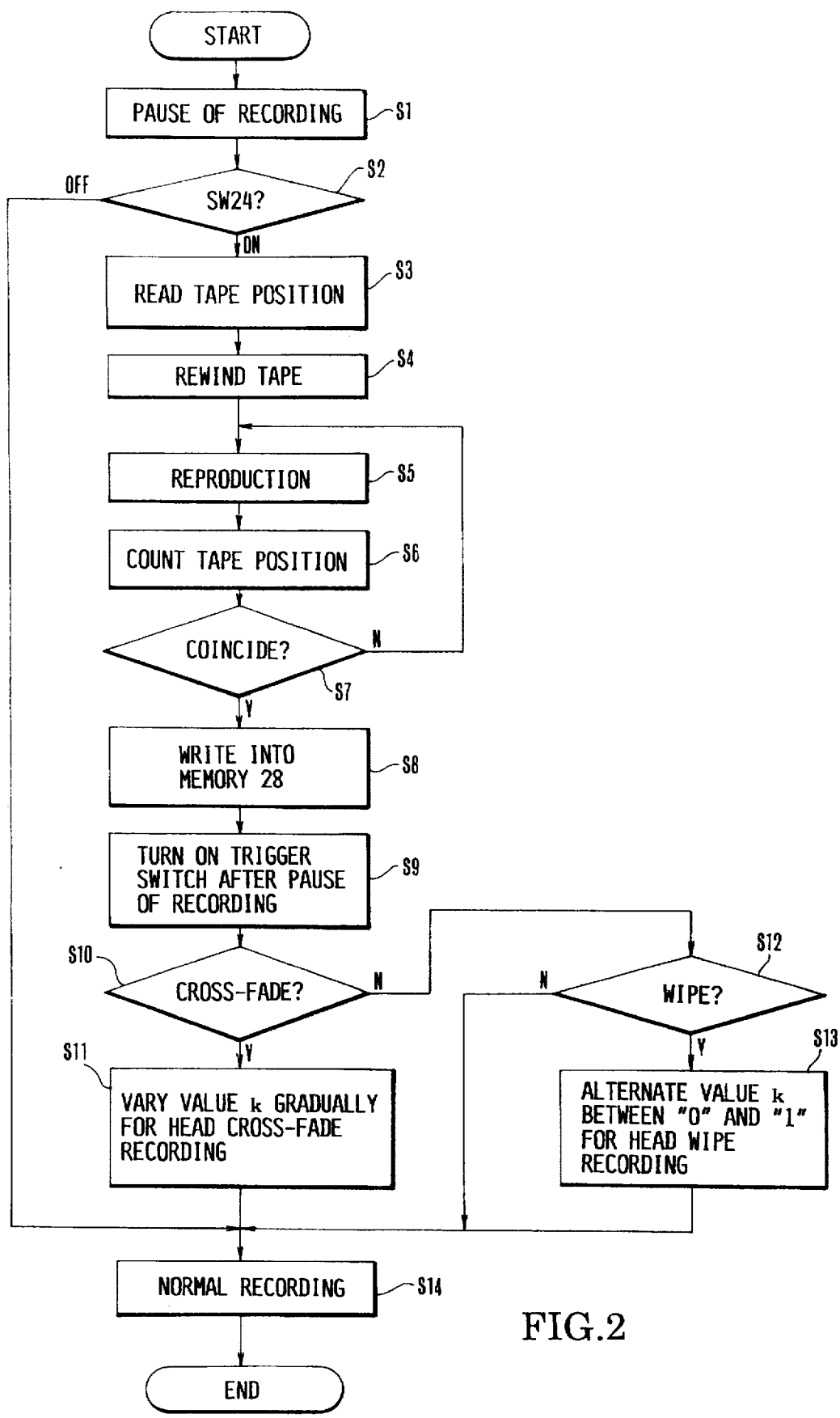
FIG. 2 is a flow chart showing the operation of the apparatus shown in FIG. 1.
Figure 3:
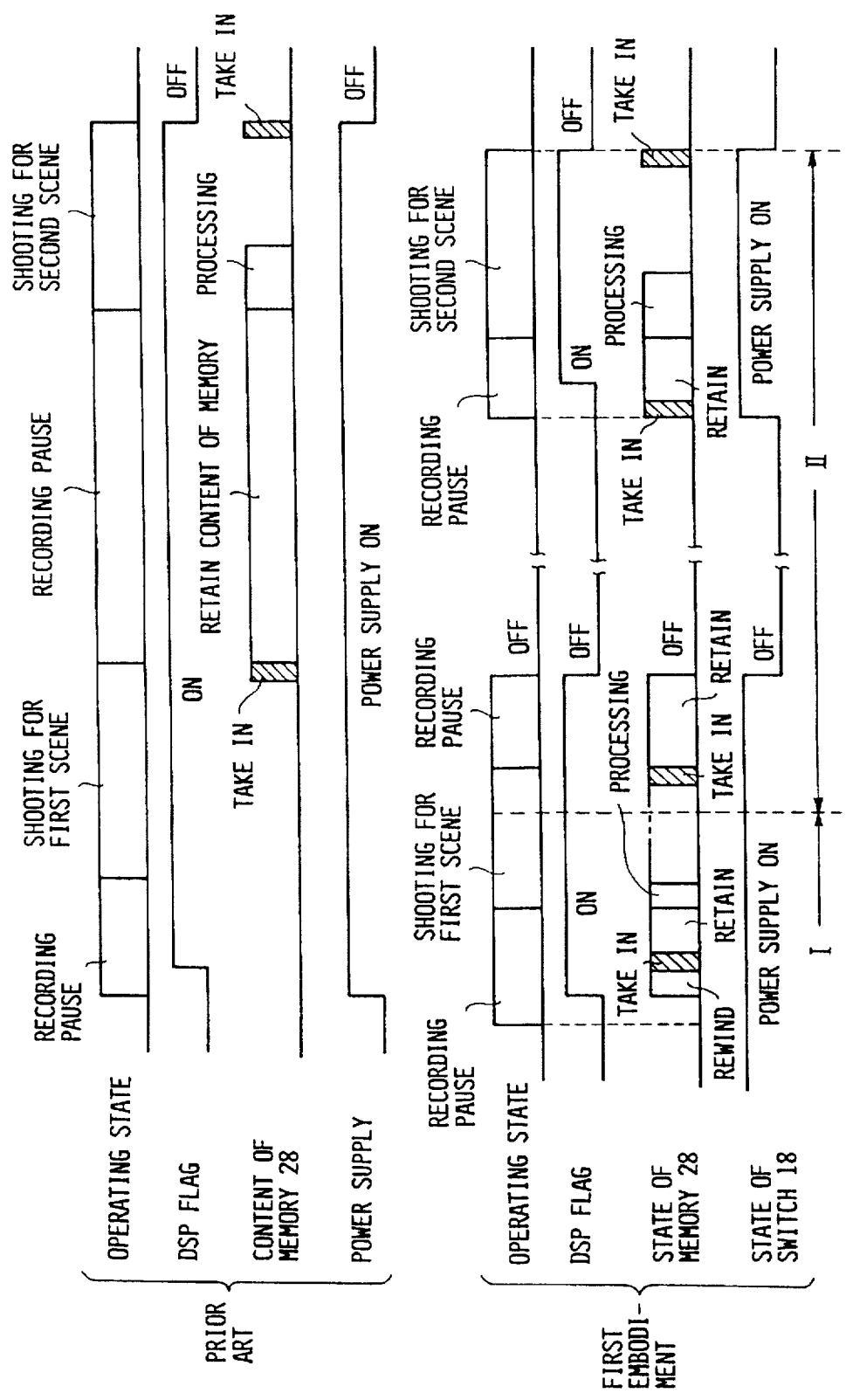
FIG. 3 is a timing chart.

Referring to FIG. 3, the operation on the above-stated second mode is represented by another period II. The operation in the second mode is as follows. In the case of this embodiment, the power supply can be switched off between a first scene shooting process and a second scene shooting process. When the power supply is switched off, all the switches 20, 22 and 18 turn off. Therefore, with the power supply turned off, information on the last picture retained by the memory 28 is erased. However, when the power supply is again switched on, the information on the last picture is obtained by reproducing the record from the last track on the magnetic tape by pre-rolling and is then taken into the memory 28 irrespectively of the on- or off-state of the DSP flag. In this instance, the position of the switch 26 is shifted to the side "a", and the switch 20 is turned on to supply electric power to the circuit 12. This enables the memory 28 to store beforehand the information on the last picture. Therefore, with recording in pause, the pause of recording can be immediately canceled with the DSP flag turned on by turning the DSP switch on. When the recording pause is canceled and the second scene shooting is allowed to begin by turning the trigger switch on, a special effect attaining process can be carried out through procedures like the steps S10 to S13 of the flow chart of FIG. 2.

In the embodiment described, the memory is arranged to retain the information on the last picture if recording is in pause like in the case of the conventional arrangement. However, once the power supply is switched off, the contents of the memory are erased. The information is rewritten into the memory when the power supply is again switched on. This eliminates the fear of wasteful consumption of the energy of the battery in the event of a long interval between the first and second scenes.

In accordance with this invention, the above-stated arrangement obviates the necessity of a continuous backup action for the field memory 12 by continuously supplying electrical energy to the special effect shooting circuit 12 for the purpose of retaining an image reproduced for the special effect attaining process. This saves the electric energy of the battery from being wasted and is advantageous particularly for a camera-integrated type VTR. Another advantage of the invention lies in that since any desired image or scene can be used for the special effect shooting any time by selecting it from among images recorded on the tape 60 or on any other tape. Therefore, the invented arrangement broadens the range of selectable special shooting effects.

As apparent from the foregoing description, the embodiment is capable of permitting a special effect attaining process by using an image recorded on a recording medium and with a minimum amount of electric energy.

Figure 4:
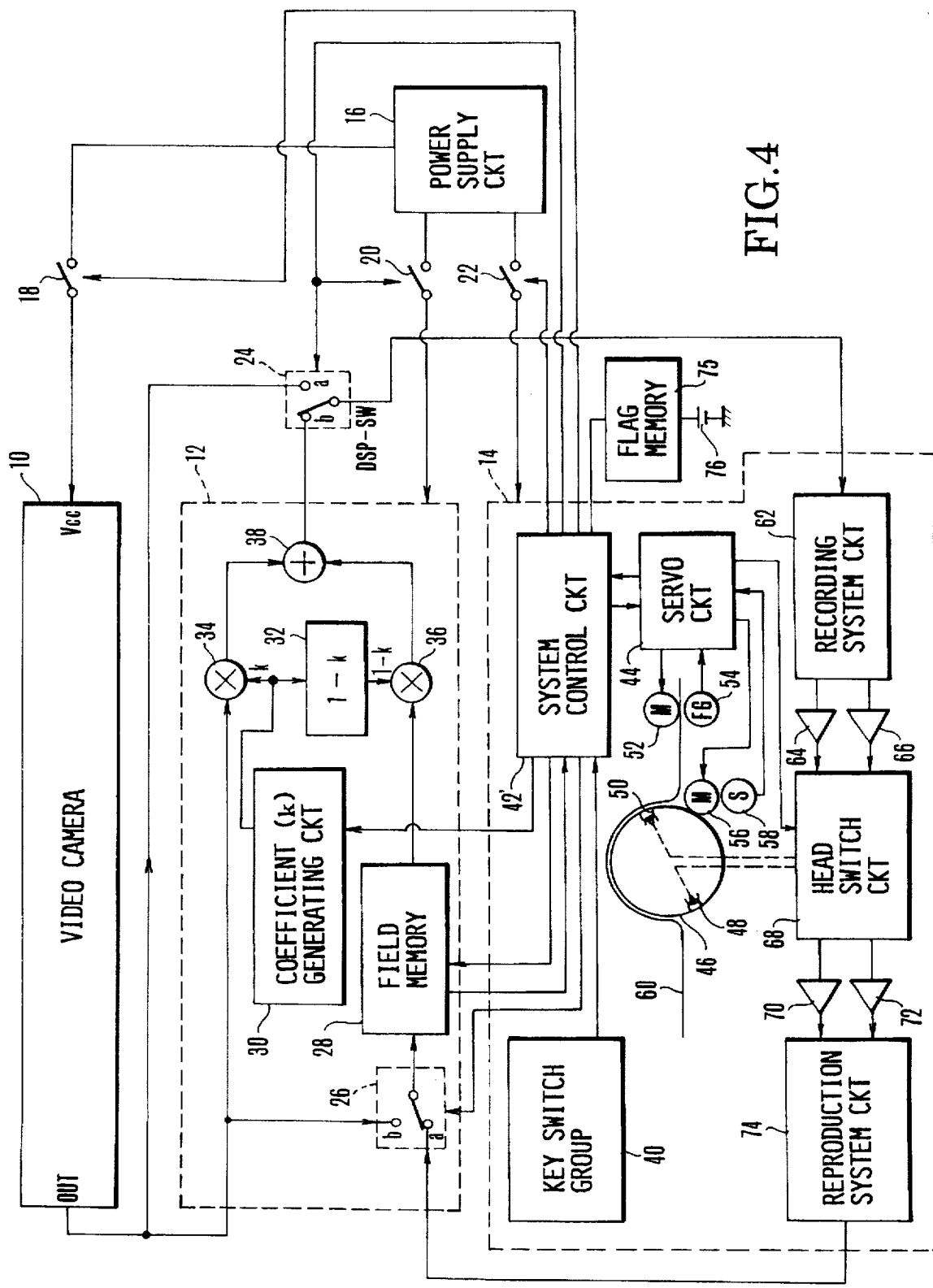
FIG. 4 is a block diagram showing the arrangement of an apparatus arranged as a second embodiment of the invention.

The following describes a second embodiment of the invention. FIG. 4 shows the arrangement of the second embodiment. The second embodiment is characterized by the use of a DSP flag memory 75 which is backed up by a battery 76. With the exception of this, the rest of the arrangement of the second embodiment is similar to the first embodiment which is shown in FIG. 1.

Figure 5:
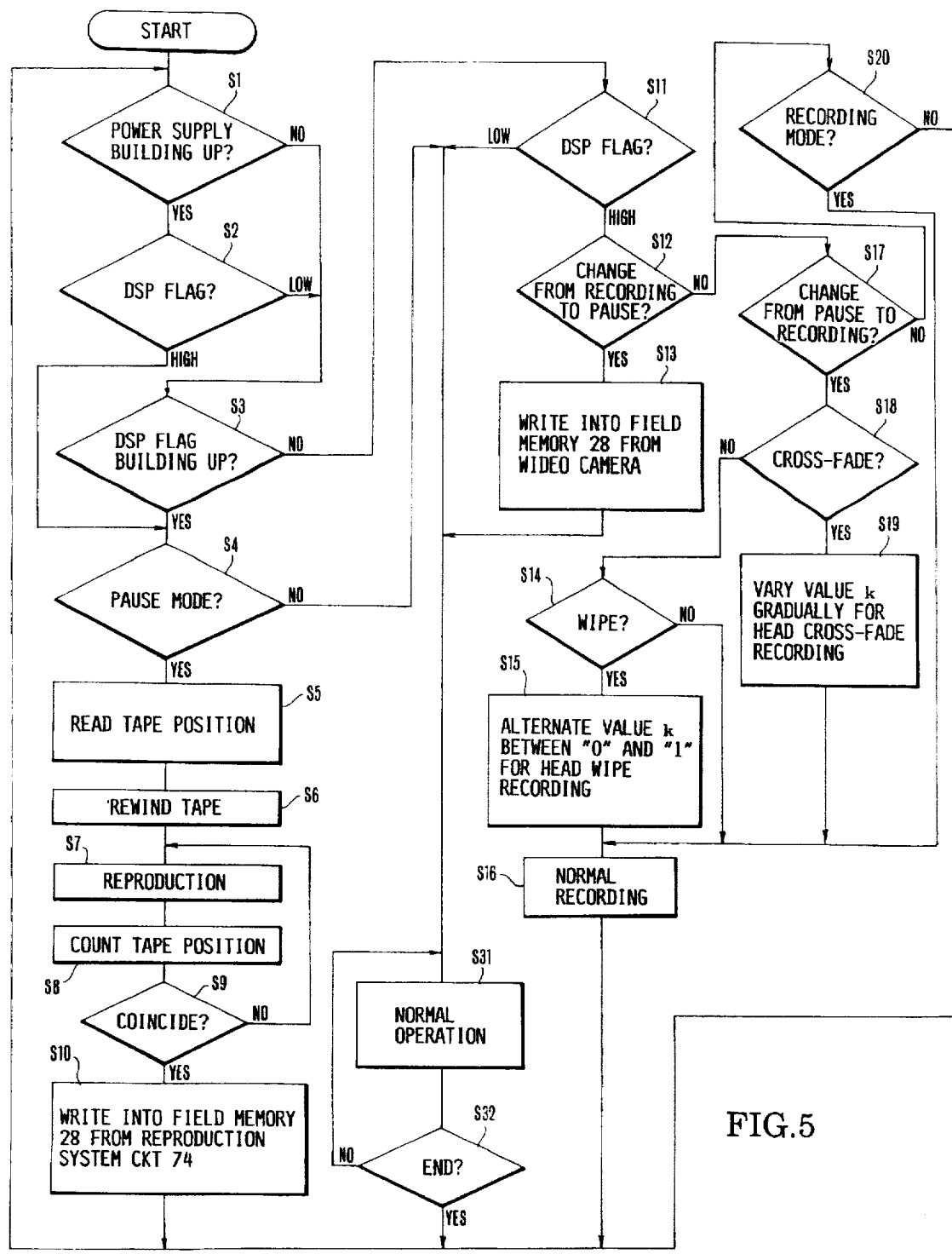
FIG. 5 is a flow chart showing the operation of the apparatus of FIG. 4.

Referring to FIG. 5 which is a flow chart, the operation of the second embodiment is as follows: At a step S1: When a power source (not shown) of the apparatus is switched on, the building up of power supply is found and the flow comes to a step S2. Step S2: The DSP flag is checked for its state. If its level is found to be high, the flow comes to a step S4. If not, the flow comes to a step S3 like in a case where the building up of power supply is not detected at the step S1. The system control circuit 42' of the second embodiment is arranged to cause the level of the DSP flag to alternately become high and low in a repeating manner every time the DSP button of the switch group 40 is pushed. Further, in the case of the second embodiment, a previous state is retained even when the main power supply is switched off. Step S3: With the DSP flag at a high level thus indicating a special effect mode, if the power supply is again switched on, the flow comes from the step S3 to a step S4. Step S4: A check is made to see if a pause mode has already been set when the power supply is switched on, the flow proceeds to a step S5. Step S5: If the three conditions of the above-stated steps have been satisfied, the system control circuit 42' shifts the connecting positions of the switch 24 to its side "b". At the same time, the switch 20 is closed to permit a power supply to be effected to the special effect shooting circuit 12. The system control circuit 42' then reads the current tape position from the tape counter which is mentioned in the foregoing. Step S6: The tape is rewound to a little degree in a short rewinding mode. Step S7: The apparatus takes a reproduction mode. Steps S7, S8 and S9: While counting the output of the FG 54, the tape is brought back to a point at which recording is put to the pause, i.e., the current tape position read out at the step S5. When the current tape position is resumed, the flow comes to a step S10. Step S10: The reproduction output of the reproduction system circuit 74 is written into the field memory 28 via the switch 26. While the reproduction output is being written at the step S10, a pause is automatically put to recording on the tape 60. After the step S10, the flow comes back to the step S1.

When the flow comes back to the step S1, the power supply is not in the building up state; and then the level of the DSP flag is also not in the building up state at the step S3. Therefore, the flow proceeds to steps S10, S1, S3 and S11 one after another in that order. When the DSP button which is disposed within the key switch group 40 is pushed, the DSP flag is repeatedly set and reset alternately by the system control circuit 42' as mentioned in the foregoing. This state is maintained by the backup power source 76. When the flow branches out from the step S3 to a step S11 with the DSP button pushed to set the DSP flag memory 75, the flow of operation takes place in the following manner. At the step S11: A check is made for the state of the DSP flag. Since it is set and is at a high level, the flow comes to a step S12. Step S12: A check is made for a recording pause. Normally the recording mode has not been changed to a pause mode at this step. Therefore, the flow branches out to a step S17. Step S17: A check is made for a change from a pause over to recording. If a scene to be shot is determined and a trigger switch (not shown) is turned on for the start of shooting, the flow proceeds to a next step S18. In the event of a cross-fade process, the flow comes to a step S19. At the step S19: Under the control of the system control circuit 42', the coefficient generating circuit 30 generates a coefficient k which gradually increases from "0" to "1". The multiplier 34 multiplies the output of the video camera 10 by the coefficient value k. The multiplier 36 multiplies the output of the memory 28 by a value (1-k). The outputs of these multipliers 34 and 36 are added together by the adder 38. The output of the adder 38 is supplied via the switch 24 to the recording system circuit 62 to be magnetically recorded on the tape 60. With the coefficient value k gradually changed from "0" to "1", a recording image obtained when recording is put to a pause is gradually replaced with an image obtained from the camera 10. When the value k reaches "1", the system control circuit 42' shifts the connecting position of the switch 24 to one side "a" thereof. Then, the power supply to the special effect shooting circuit 12 is cut off by turning the switch 20 off. This brings the cross-fade process to an end. The flow then comes to a step S16. At the step S16, recording in the normal mode is performed to record the image signal output from the camera.

In a case where the flow comes to a step S14 for a wipe effect process instead of the cross-fade process, the embodiment operates as follows. At a step S15, in synchronism with a horizontal synchronizing signal, the coefficient value k is alternately changed between "0" and "1". By this, the ratio of the picture occupying rate of the image output from the field memory 28 to that of the image output from the camera 10 is gradually changed. When the picture comes to be occupied entirely by the image output from the camera 10, the switch 24 is shifted to its one side "a" in the same manner as in the case of the cross-fade process. The switch 20 is turned off and the normal recording mode takes place (Step S16).

If the apparatus is not in a special effect shooting mode, the flow comes from the step S14 to the step S16 to take the normal recording mode. At the step S17, if the pause continues, the flow comes to a step S20. At the step S20: If the pause still continues, the flow comes back to the step S1. If the pause is found to have changed to the recording mode, the flow comes to the step S16 for normal recording. With the DSP flag found to be at a high level, if normal recording is put to a pause, the flow proceeds from the step S11 to the step S13 through the step S12. At the step S13: Image data obtained from the video camera 10 is written into the field memory 28 through the switch 26.

In the case of this embodiment, as described in the foregoing, the image data is written into the field memory 28 normally from the video camera 10, except when the power supply builds up and also when the DSP flag rises. Image data is written from the tape into the field memory 28 when the power supply is switched on and also when the DSP flag rises. In other words, it is a feature of the second embodiment that, in writing into the field memory 28, the image data is first read from the tape and, after that, the image data is read from the camera. This is further described below with reference to FIG. 6 which is a timing chart.

The special effect attaining process of the embodiment is first described with reference to the timing chart of FIG. 6. A part (A) in FIG. 6: The power supply is switched on. A part (B): A trigger switch is turned on. A part (C): In a case where a recording pause mode is to be obtained at a part (C), the mode of the apparatus changes in the order of recording - recording pause - recording - recording pause every time the trigger switch is turned on. Parts (D) and (E) show the operation of the prior art. The part (D): Assuming that the level of the DSP button becomes high when the recording pause is obtained, the tape is in repose and, therefore, an image recorded in the current tape position cannot be read out from the tape. No special effect process is possible with the DSP button turned on while the apparatus is in the recording pause mode. The DSP button is turned on to obtain a special effect shooting mode. After that, an image is recorded. Then, when a recording pause is obtained next time, image data is written into an image memory from the video camera. The image data is kept in the image memory until a next recording mode takes place. The special effect attaining process is performed when the recording mode takes place.

Figure 6:
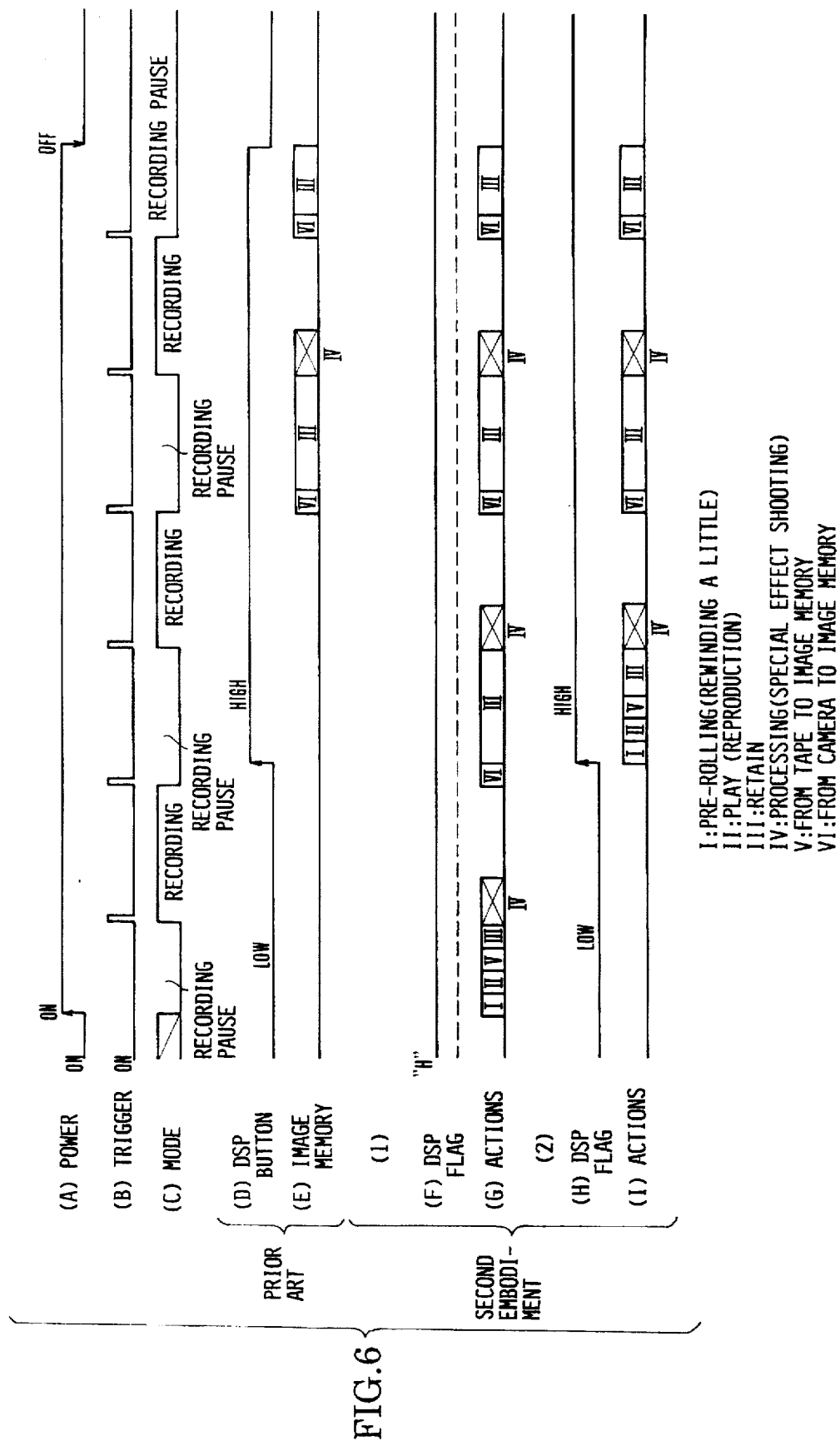
FIG. 6 is a timing chart.

While the operation of the prior art apparatus is as shown at the parts (D) and (E), parts (F) to (I) of the timing chart of FIG. 6 show the operation of the second embodiment of this invention. Part (F): The DSP flag is assumed to have been at a high level when the power supply is switched on. Since the DSP flag of the embodiment is provided with the backup arrangement, it is kept in the previous state. When the power supply is switched on as shown at the part (A) with the DSP flag at the high level, actions I to VI are performed as follows: Part (G). The recording pause is first canceled. Then, at the first step of operation, the tape is rewound to a little degree in the short rewinding mode by the action I. The apparatus is set into a reproduction mode (action II). A reproduced image which is obtained immediately before the recording pause is written into the field memory (action V). The image data is retained in the memory (action III). In accordance with the timing of turning-on of the trigger switch as shown at the part (B), the special shooting effect attaining process is carried out (action IV). At the second step and ensuing steps, the embodiment operates to write image data from the video camera into the memory (action VI); to keep the image data (action III); and to carry out likewise the special shooting effect attaining process (action IV) in synchronism with the timing of the trigger switch.

In a case where the level of the DSP flag becomes high during the recording pause, the embodiment operates as follows. As shown at the part (H), if the level of the DSP flag rises during the recording pause, the pause is canceled in the same manner as when the power supply builds up. Then, as shown at the part (I), the tape is rewound to a little degree in the short rewinding mode (action I). The reproduction mode takes place. The tape position obtained immediately before the recording pause is detected through the counted value of the tape counter. Reproduced image data thus obtained is written into the memory (action V). Then, the recording pause mode again takes place. The image is retained in the memory until the trigger switch (or button) is pushed (action III). The special effect process is performed when the trigger switch is turned on (action IV). At a second and ensuing steps, image data is written into the memory from the video camera, instead of from the video tape, as the level of the DSP flag does not rise (action VI). The embodiment is characterized by this operation. The image data from the video tape is written into the memory only at the first step and the image data from the video camera is written into the memory at the second and ensuing steps, because the image obtained from the video camera has a better quality than the image obtained from the video tape. The image data is retained by the memory until the trigger button is operated (action III). After that, the special effect process is performed when the trigger switch turns on (action IV). The content of the memory disappears when the power supply is switched off. However, that of the flag memory is retained by virtue of the backup arrangement.

The first embodiment shown in FIGS. 1, 2 and 3 is arranged to allow the power supply to be turned off only for the special effect shooting circuit. Whereas, the second embodiment is allowed to allow the power supply to be turned off for all the elements including the video camera 10, the special effect shooting circuit 12 and the recording and reproduction circuit 14 (through the switches 18, 20 and 22). Therefore, electric energy can be saved from being wasted to a greater degree. When the power supply builds up, the flag memory is checked for its content. If the level of the flag memory is high, the operation is performed in the same manner as the operation of the first embodiment performed after building up of the power supply.

While a tape-shaped recording medium is used in each of the embodiments described in the foregoing, the media usable in accordance with this invention are not limited to the tape-shaped medium. A disc-shaped medium or a card-shaped medium is also usable in accordance with this invention. Further, in accordance with this invention, the usable media include a magnetic medium, an optical disc-shaped medium or, in some cases, a solid-state memory such as a Block line memory or a semiconductor memory.

What is claimed is:

1. A recording apparatus, comprising:

recording means for recording an image signal on a recording medium;

conversion means for converting an object image into an image signal;

a memory for storing image signals for one picture;

combining means for combining the image signals read out from the memory and the image signal converted by said conversion means;

mode switching means for switching a mode of said apparatus among a plurality of modes including a first mode in which said recording means records the image signal combined by said combining means and a second mode in which said recording means records the image signal output from said conversion means;

retaining means for retaining mode data indicating the mode, said retaining means retaining the mode data in a power supply-off state; and control means for controlling the memory and said recording means according to the mode data retained by said retaining means.

2. An apparatus according to claim 1, further comprising:

reproducing means for reproducing image signals from the recording medium;

selection means for selectively outputting the image signal output from said conversion means and the image signal reproduced by said reproducing means.

3. An apparatus according to claim 2, wherein said combining means is arranged to continuously change a combining ratio.

4. An apparatus according to claim 2, wherein said selection means outputs the image signal converted by said conversion means when said recording means is in a recording mode.

5. An apparatus according to claim 2, wherein said selection means outputs the image signal reproduced by said reproducing means when said reproducing means is in reproducing mode.

6. An apparatus according to claim 2, wherein said selection means selects the image signal according to a predetermined sequence.

7. A recording apparatus, comprising:

(a) recording means for recording an image signal on a recording medium;

(b) conversion means for converting an object image into an image signal;

(c) memory means for storing image signals for one picture;

(d) mode setting means for setting a mode of said apparatus among a plurality of modes including a first mode in which said recording means records the image signals for one picture repeatedly read out from said memory means and a second mode in which said recording means records the image signal output from said conversion means;

(e) retaining means for retaining mode data indicating the mode, said retaining means retaining the mode data in a power supply-off state; and f) control means for controlling the memory and said recording means according to the mode data retained by said retaining means.

8. An apparatus according to claim 7, further comprising:

combining means for combining the image signal repeatedly read out from said memory means and the image signal from said conversion means in such a manner that the combining ratio is successively changed in accordance with a lapse of time wherein said combining means is arranged to continuously change said combining ratio.

9. An apparatus according to claim 7, further comprising:

reproducing means for reproducing image signals from the recording medium;

selection means for selectively outputting the image signal output from said conversion means and the image signal reproduced by said reproducing means.

10. An apparatus according to claim 9, wherein said selection means outputs the image signal converted by said conversion means when said recording means is in a recording mode.

11. An apparatus according to claim 9, wherein said selection means outputs the image signal reproduced by said reproducing means when said reproducing means is in a reproducing mode.

12. An apparatus according to claim 9, wherein said recording means records the combined image signals on the recording medium.

13. A recording apparatus, comprising:

recording means for recording an image signal on a recording medium;

conversion means for converting an object image into an image signal;

mode setting means for setting a mode of said apparatus among a plurality of modes including a first and second mode in which said recording means performs different recording operation from each other;

retaining means for retaining mode data indicating the mode, said retaining means retaining the mode data in a power supply-off state; and control means for controlling the memory and said recording apparatus according to the mode data retained by said retaining means.

* * * * *

UNITED STATES PATENT AND TRADEMARK OFFICE
CERTIFICATE OF CORRECTION

PATENT NO. : 5,787,227
DATED : July 28, 1998
INVENTOR(S) : Isao Harigaya, et al.

It is certified that error appears in the above-identified patent and that said Letters Patent is hereby corrected as shown below:

Col. 2, line 53, delete "bag" and insert -- b --.

Col. 9, line 36, before "f" insert -- ( --.

Signed and Sealed this

Twenty-second Day of December, 1998

Attest:

BRUCE LEHMAN

Attesting Officer         Commissioner of Patents and Trademarks